3,565,819
PROCESS OF PRODUCING MICROCAPSULES
Karl G. Gragger, Laurel, Md., assignor to Westvaco Corporation, New York, N.Y., a corporation of Delaware
No Drawing. Filed Feb. 13, 1969, Ser. No. 799,105
Int. Cl. A61k 9/04; B01j 13/02; B44d 1/02
U.S. Cl. 252—316                                   8 Claims

ABSTRACT OF THE DISCLOSURE

Pressure-rupturable microcapsules having outer walls of wax which encase droplets of an oily material are produced in the absence of coacervation forces by emulsifying an oil-in-water type of emulsion into melted wax, to form a water-in-oil type of emulsion, then dispersing the wax emulsion to form micro-droplets thereof in an aqueous phase, and cooling the resulting dispersion to solidify the wax. A membrane of hydrophilic colloid material impermeable to the encapsulated oil is formed between the oil and the wax and acts as a protective colloid. The dispersion of microcapsules can be coated onto an appropriate base sheet or the microcapsules can be recovered by spray drying or by filtering and drying.

BRIEF SUMMARY OF THE INVENTION

This invention relates to microcapsules and to methods of making the same. More specifically, this invention relates to processes for making microcapsules, in the absence of coacervation, by several emulsification steps which result in the formation of microcapsules having walls of wax which encase an oily core surrounded by a protective colloid, the latter separating the wax and oil.

It is know that microcapsules containing oily materials can be made by various procedures. In one well-known type of process, oil droplets are encased in a complex of hydorphilic colloids by coacervation forces, and the walls of the so-obtained capsules are subsequently hardened, such as by treatment with an aldehyde. In other processes, microcapsules are formed by interfacial polycondensation, centrifugal microencapsulation, or fluidized bed encapsulation, all of which require one or more of the following procedures to produce the final product: chemical reaction, use of solvents other than water, or wall-hardening chemical reactions. None of these procedures are required when microcapsules are made according to the present invention.

In the past, the use of waxes as microcapsule wall-forming materials has had the disadvantage that waxes are readily dissolved by most organic oils, and the wax capsule walls leaked when organic oils were encased therein. Because of this problem, the use of waxes as wall-forming materials has been limited in the past to encasing polar liquids only. Yet, waxes offer many advantages as potential capsule wall-forming materials because they are substantially inert and are relatively inexpensive. According to the present invention, waxes can be used as capsule wall material for encapsulating organic oils as well as other water-insoluble organic liquids.

It has been discovered that microcapsules can be formed, in the absence of coacervation or any other known encapsulation techniques, by a series of emulsifications. First, an oil-in-water type of emulsion is formed by dispersing an oily material in an aqueous solution of a hydrophilic colloid material. This emulsion is then added to melted wax under constant stirring to form a water-in-oil type of emulsion, referred to hereinafter as wax emulsion. At this point, a stabilizing or emulsifying agent, such as a fatty acid, is added to the wax emulsion to aid in the subsequent dispersion of the wax emulsion in an aqueous medium. The wax emulsion is then dispersed in an aqueous medium, which may be water alone, to form droplets of wax encasing the oil-in-water emulsion. The dispersion is then cooled to solidify the wax and produce a dispersion of microcapsules which have outer walls of wax encasing oil and the hydrophilic colloid. The hydrophilic colloid acts as an impermeable membrane to the oil and prevents the oil from plasticizing the wax capsule walls, and thus prevents the leakage problem attendant with past uses of wax for capsule walls. The microcapsules can be recovered by filtering the capsules and drying them or by spray drying the dispersion of capsules, to produce a free-flowing powder, or the dispersion can be applied as a coating to an appropriate flexible substrate, such as paper or film, and then the coated substrate can be dried.

In one embodiment of the invention, the aqueous phase into which the wax emulsion is dispersed is an aqueous solution of a binder or film-former, such as starch, gelatin, gum arabic, protein such as casein, or carboxymethylcellulose. The resulting dispersion of microcapsules, comprising dissolved binder having dispersed therein microcapsules having wax walls encasing the oil-in-water emulsion, may be coated directly on the surface of a suitable base by an appropriate coating device, such as a rod, blade, or air knife coater. The coated paper is then dried to produce paper coated with a coating of microcapsules, the binder acting to hold the capsules to the base sheet. The coating of microcapsules is pressure-responsive, as the capsules will rupture upon the application of localized pressure.

Capsules made according to this invention find utility in various fields. So-called pressure-sensitive coatings for no-carbon-required copy paper can be made according to the present invention. For example, a potential color-forming organic compound, known as a color-percursor, or combinations thereof, can be dissolved in the oil phase of the initial oil-in-water emulsion. After preparing a dispersion of microcapsules which are formed by several emulsification steps, as described above, paper is coated with the dispersion containing microcapsules of wax encapsulating the oil, color-percursor, and protective colloid, and the so-coated paper is then dried. The coated side represents the under side of a top sheet of paper. The top side of a second sheet of paper is coated with a color-forming reactant, such as attapulgite or bentonite clay. When the sheets are placed together, and localized pressure is applied to the top sheet, the capsules rupture and release the encased materials, and a color-forming reaction takes place on the attapulgite or bentonite-coated surface of the second sheet of paper.

The capsules and dispersions of capsules made according to the present invention can be used in other fields. For example, adhesive-activating materials, odoriferous compositions, food flavorings, or medicines can be encased in capsules made by the processes described herein. Thus, an adhesive-activating material can be encapsulated by our processes and the capsules can be applied to a suitable substrate as a pressure-responsive coating, with the result that the adhesive-activating material is released when the capsules are ruptured.

The internal phase of the initial oil-in-water type of emulsion for purposes of this invention is preferably a water-insoluble oily, organic material. The characteristics of the internal phase are not critical except as to their property of being insoluble in the aqueous external phase. The internal phase is an "oil" and is present in the external phase as colloidal droplets, such as is true for oil-in-water emulsions. Oils that can be used are of an infinite variety and number and include such materials as mineral, vegetable, animal, fish and synthetic oils such as castor oil, petroleum oils, and chlorinated di- and triphenyls and mixtures thereof. The oil may contain other oil-soluble materials. If the final dispersion of capsules is to be used as a coating for no-carbon-required paper, then the oil will also have dissolved therein an oil-soluble color-precursor.

The external phase of the initial oil-in-water emulsion is an aqueous solution of a hydrophilic colloidal material which is not miscible with the internal phase. A hydrophilic colloidal material, which will form as a protective colloid between the internal oily phase and the wax capsule wall, is used. Preferably, the hydrophilic colloid material is gellable and film-forming so that when the wax microcapsule walls are solidified by cooling, the encapsulated hydrophilic colloid material becomes gelled and forms an impermeable film between the encased oil and the wax walls. It has been found that gelatin or gum arabic provides an excellent membrane impermeable to organic oils. Thus, the internal oil phase is emulsified into an aqueous solution of gelatin or gum arabic to form an oil-in-water emulsion. This emulsion is then added to melted wax, as for example microcrystalline waxes or paraffin waxes, and the oil-in-water emulsion is emulsified into the melted wax to produce a water-in-oil type of emulsion. The water-in-oil emulsion is then dispersed or emulsified into an aqueous phase which may be water or an aqueous solution of a binder, to produce microdroplets of the wax emulsion in the aqueous phase. The wax walls of the droplets solidify and the hydrophilic colloid material gels as the dispersion cools, to form microcapsules as described above. The microcapsules are pressure-rupturable to release the encased oil and any materials that are dissolved in the oil.

Emulsions for purposes of the present invention may be made by any of the usual emulsification equipment, such as by mixing the internal and external phases in a blender, colloid mill, or emulsifier. Under high shear, colloidal droplets of the internal phase are dispersed in the external phase.

DETAILED DESCRIPTION

The invention will be described in greater detail with the aid of the following examples.

Example 1

An external phase for an emulsion was prepared by dissolving 5 grams of purified pigskin gelatin, having an isoelectric point of about 9.2, in 50 milliliters of water heated to approximately 140° F. The pH of the resulting gelatin solution was about 5.4.

An internal phase for the emulsion was prepared by heating 96 grams of a mixture of chlorinated bi- and triphenyls (Aroclor 1242) to a temperature of about 140° F. An emulsion was then prepared by dispersing the internal phase into the external phase in a blender under high shear conditions, to form an oil-in-water emulsion. The resulting emulsion was stirred under gentle agitation for about 3 hours at a temperature of about 160° F., a temperature higher than the gelation point of the gelatin, to age the emulsion.

Seventy-three grams of white microcystalline wax (163/169) were heated to about 165° F. to melt the wax. Under constant agitation, and while maintaining the temperature of the wax at about 165° F., the oil-in-water emulsion, prepared above, was slowly added to the molten wax, to form an oil-in-water-in-wax emulsion. Then about 0.5% of stearic acid, based on the weight of wax, was added to the emulsion to aid in the subsequent dispersion of the oil-in-water-in-wax emulsion in an aqueous medium.

The resulting water-in-oil type of emulsion from above was slowly added, under constant agitation, to 1,000 milliliters of a 10 percent by weight solution of carboxymethylcellulose (CMC) heated to about 165° F., to form an oil-in-water type of emulsion. In other words, droplets of wax were dispersed in the CMC solution, and the wax droplets had dispersed therein the initial oil-in-water emulsion of Aroclor in aqueous gelation. The dispersion of wax droplets was then allowed to cool to room temperature and the wax solidified to form discrete microcapsules dispersed in the CMC solution. The resulting dispersion of microcapsules was coated directly onto paper. Upon drying, the coated paper could be impinged by the application of pressure, causing the microcapsules to rupture and release the encapsulated Aroclor at the point of pressure application.

Example 2

This is an example of preparing microcapsules for use in a coating for no-carbon-required copy paper.

Example 1 was repeated, except that color-precursors were dissolved in the oil phase of the initial emulsion. In this case, the internal phase for the initial emulsion comprised 96 grams Aroclor and dissolved therein were 2 grams of each of the color-precursors 3,3-bis(4-diethyl-aminophenyl)-6-dimethylamino phthalide and benzoyl leucomethylene blue.

A dispersion of microcapsules was made according to the procedures described in Example 1. The microcapsules comprised walls of wax which encased the gelatin protective colloid oil (Aroclor), and the dissolved color-precursors. The dispersion of microcapsules was coated onto paper and dried. A sheet of the so-coated and dried paper was placed on top of a sheet of paper coated with attapulgite clay, an electron acceptive adsorbent, with the pressure-responsive coating on the top sheet in contact with the attapulgite clay coating on the bottom sheet. When pressure was applied to the top sheet, as by writing with a pen or pencil, the microcapsules ruptured and a color-forming reaction occurred when the color-precursors were adsorbed onto the attapulgite clay surface. After storing the pressure-sensitive coated paper for a period of about one month, there was every indication that the microcapsules were substantially leak-proof.

More than one color-precursor dissolved in the encapsulated oil is not required in order to obtain a color-forming reaction. The two chosen for purposes of illustration here were used together in order to produce an instant color-forming reaction as well as a permanent one.

As stated previously, waxes other than microcrystalline waxes may be employed in the present invention. Petroleum waxes perform well in the invention. Also, an aqueous solution of a binder other than carboxymethylcellulose may be used such as aqueous dispersions of casein, starch, gelatin, gum arabic, and the like. Or the final aqueous phase into which the wax emulsion is dispersed may not contain any binder, but may be water alone in which the formed microcapsules are dispersed for subsequent recovery. Furthermore, it is obvious that changes in the proportions of ingredients and ratios among the various internal and external phases described can be made.

From the above, it can be seen that it is possible according to the present invention to encase organic liquids other than polar ones in microcapsules having outer walls of wax which are protected from the encapsulated liquid by the expedient of a protective colloid. The microcapsules are produced by physical methods of encapsulation, rather than by chemical ones, and the microcapsules so-produced find utility in various fields, one being the pressure-sensitive coating field.

As one skilled in the art will readily appreciate, various modifications may be made in the examples and descriptions as set out above without departing from the spirit of the invention or the scope of the appended claims.

I claim:
1. The method of producing pressure-rupturable microscopic oil-containing capsules each having an oily core, an outer wall of wax, and a hydrophilic colloidal material separating the oily core from the wax wall, which comprises the steps of:
    (a) dispersing a water-insoluble organic liquid in an aqueous solution of a hydrophilic film-forming col- loidal material, to form an oil-in-water emulsion,
(b) adding under agitation the oil-in-water emulsion to melted wax to form an oil-in-water-in-wax emulsion comprising droplets of the oil-in-water emulsion of step (a) above dispersed in the melted wax,
(c) adding to the oil-in-water-in-wax emulsion an emulsifying agent to enable emulsification of the oil-in-water-in-wax emulsion into an aqueous medium,
(d) dispersing the oil-in-water-in-wax emulsion in an aqueous medium as droplets of wax having emusified therein the oil-in-water emulsion of step (a) above,
(e) and solidifying the wax droplets to form microcapsules having outer walls of solidified wax encasing the oil-in-water emulsion of step (a) above, whereby hydrophilic film-forming colloidal material separates the encased water-insoluble organic liquid from the wax walls of the microcapsules.

2. The method of claim 1 which includes the step of dissolving an oil-soluble color-precursor in the water-insoluble organic liquid before the water-insoluble organic liquid is dispersed in the aqueous solution of hydrophilic film-forming colloidal material.

3. The method of claim 1 in which the aqueous medium in step (d) thereof is an aqueous solution of a film-forming binder material, and the microcapsules formed according to claim 1 are dispersed in the aqueous film-forming binder material.

4. The method of claim 1 wherein the hydrophilic film-forming colloidal material is selected from the group consisting of gelatin and gum arabic.

5. The method of claim 1 wherein the hydrophilic film-forming colloidal material is gelatin.

6. The method of claim 1 wherein the emulsifying agent added in step (c) thereof is a fatty acid.

7. The method of claim 1 wherein the wax is a material selected from the group consisting of microcrystalline waxes and paraffin waxes.

8. The method of producing a dispersion of pressure-rupturable oil-containing microcapsules each having an oily nucleus and outer wall of wax, with hydrophilic colloidal material impermeable to the oily nucleus separating the nucleus and the wax wall, which comprises the steps of:

(a) dispersing a water-insoluble organic liquid in an aqueous solution of a gellable hydrophilic film-forming colloid material heated above the gelation temperature of the said colloid material, to form an oil-in-water emulsion comprising droplets of the organic liquid dispersed in the aqueous solution of colloid material,
(b) preparing an external phase for an emulsion by heating wax above its melting point to form molten wax,
(c) dispersing the oil-in-water emulsion of step (a) above as droplets in the molten wax to form an oil-in-water-in-wax emulsion,
(d) adding to the oil-in-water-in-wax emulsion an emulsifying agent to aid subsequent dispersion of the oil-in-water-in-wax emulsion in an aqueous medium,
(e) dispersing the oil-in-water-in-wax emulsion as droplets in an aqueous solution of film-forming binder material heated above the melting point of the wax, said droplets being droplets of wax having emulsified therein the oil-in-water emulsion of step (a) above,
(f) and solidifying the wax and gelling the hydrophilic colloid material by cooling to form microcapsules having outer walls of solidified wax encasing the gelled hydrophilic colloid material and organic liquid, the gelled hydrophilic colloid material separating the organic liquid and the wax, the microcapsules so-formed being dispersed in the aqueous film-forming binder material.

References Cited
UNITED STATES PATENTS

| | | |
|---|---|---|
| 3,016,308 | 1/1962 | Macaulay. |
| 3,161,602 | 12/1964 | Herbig et al. |
| 3,265,629 | 8/1966 | Jensen. |
| 3,405,070 | 10/1968 | Reyes. |

RICHARD D. LOVERING, Primary Examiner

U.S. Cl. X.R.

99—140; 117—36.2, 100; 264—4; 424—34, 37, 38